United States Patent [19]

Erickson et al.

[11] 4,094,673
[45] June 13, 1978

[54] ABRADABLE SEAL MATERIAL AND COMPOSITION THEREOF

[75] Inventors: Arnold Roderick Erickson, Orange City, Fla.; Carlino Panzera, Belle Mead, N.J.

[73] Assignee: Brunswick Corporation, Skokie, Ill.

[21] Appl. No.: 737,505

[22] Filed: Nov. 2, 1976

Related U.S. Application Data

[62] Division of Ser. No. 440,794, Feb. 28, 1974, abandoned.

[51] Int. Cl.² .............................................. B22F 5/00
[52] U.S. Cl. .................................... 75/246; 75/126 Q; 75/126 R; 75/124; 75/171; 75/229; 415/172 R; 428/566
[58] Field of Search ............. 415/172; 75/171, 126 Q, 75/126 R, 124, 246, 229, 200, 222; 428/566

[56] References Cited

U.S. PATENT DOCUMENTS

| | | | |
|---|---|---|---|
| 2,839,396 | 6/1958 | Marsh | 75/171 |
| 3,519,282 | 7/1970 | Davis | 415/152 A |
| 3,620,693 | 11/1971 | Sama | 75/171 |
| 3,754,903 | 8/1973 | Goward | 75/171 |
| 3,817,719 | 6/1974 | Schilke et al. | 75/171 |
| 3,879,831 | 4/1975 | Rigney et al. | 75/171 |
| 3,973,952 | 8/1976 | Bieber et al. | 75/171 |

*Primary Examiner*—Brooks H. Hunt
*Attorney, Agent, or Firm*—John G. Heimovics; William G. Lawler; David S. Guttman

[57] ABSTRACT

An abradable seal material suitable for high temperature application in turbomachinery comprising a sintered mat of (1) randomly disposed fine metal fibers, or (2) fine metal powders or (3) both fibers and powders. The metal fiber and powder are composed of an alloy consisting essentially of I, Al, Cr, II, or I, Al, Cr, III, wherein I is at least one member of the group Fe, Co, Ni, and Co plus Ni, II is a member of the group consisting of Y, Sc and Rare Earths, and III is at least one member of the group consisting of Si, Hf, Zr, Cb, and Ta. The exposed surfaces of the fibers and powder forming the seal are protected against oxidation at high temperatures by a coating of $Al_2O_3$ which is formed on the substrate. Said substrate has an Al content of at least 4% to replace spalled $Al_2O_3$ and for "healing" any $Al_2O_3$ scale fractures.

6 Claims, 5 Drawing Figures

ABRADABLE SEAL MATERIAL AND COMPOSITION THEREOF

This application is a divisional application of Ser. No. 440,794, filed Feb. 28, 1974, now abandoned.

BACKGROUND OF THE INVENTION

1. Field of the Invention

This invention relates to abradable materials useful in high operating temperature sealing members. The new and improved materials described herein below are particularly useful as sealing surfaces between adjacent rotating and stationary elements of turbomachines, such as compressors and turbines, which operate at elevated temperatures.

2. Description of the Prior Art

As is well known in the art, the efficiency of gas turbine engines is dependent in part on the peripheral seal between the ends of the rotor and stationary blades, and the adjacent engine structure. The use of abradable sealing materials is well known and a number of different methods have been proposed for employing such materials. See for example, U.S. Pat. No. 3,413,136, wherein an abradable porous nickel sealing surface is formed on affected engine parts by a spray technique. U.S. Pat. No. 3,519,282 shows an abradable, porous, metal fiber seal wherein the pores are filled with copper and/or nickel powder. The advantages of metal fiber seals are set forth therein in some detail. Porous metal seals are likewise employed for this purpose, as is shown for example by U.S. Pat. No. 3,268,997 and 3,350,178. However, it has been found that due to high temperatures involved, oxidation of the seals employed heretofore can occur, lessening the sealing capability and lowering efficiency.

SUMMARY OF THE INVENTION

A porous seal made of fine particles of an alloy having the composition I, Cr, Al, II; or I, Cr, Al, III, wherein I may be Co, Fe, Ni, and Co plus Ni, II may be Y, Sc, or Rare Earths, and III may be Si, Hf, Zr, Cb or Ta, and wherein the seal is coated with an $Al_2O_3$ layer, is substantially protected against oxidation at high operating temperatures. The seal is abradable, and is fitted to the desired tolerance by placing it in its functional environment, e.g. a turboengine, and causing rotating elements of the equipment which contact the seal to rub away any projecting portions.

The seal may be installed in unoxidized conditions and the protective $Al_2O_3$ coating is then formed during use. Alternatively, the seal may be first given an oxidizing treatment to form the $Al_2O_3$ coating as by exposure to a hot oxygen containing gas, and then installed in the engine.

Both fibers and powder, either alone or in combination, may be employed in making the seal. As employed herein, the term "particle" is to be understood as covering both the fine metal fibers and the finely divided metal powder which may be employed in fabricating the seal.

The alloy composition is such that after the $Al_2O_3$ coating is formed the substrate contains at least 4% Al. Alloy compositions (given in weight percent) meeting the requirements are within the broad range of, by weight, about 15–25% Cr; about 5–20% Al; about 0.01–0.5% II and about 0.5–2.0% III when I=Co or Ni, and about 0.1–1.0% III when I=Fe; and the remainder Co, Fe, Ni. The diameters of the fiber and powder particles are within the broad ranges (in microns) of about 4 to 150 and about 4 to 100, respectively. The aspect ratios (L/D) of the fiber are broadly from 10 to about 4200, and the aspect ratio of the powder is around 1, but may be as great as 7 or 8.

SUMMARY OF BASIC OBJECTS

Figure 1:
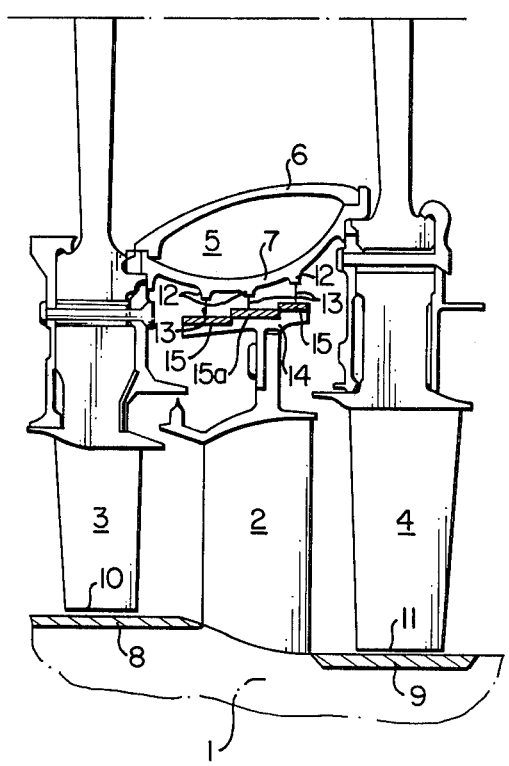
FIG. 1 is a fragmentary schematic cross-sectional view of a segment of a gas turbine engine employing the present invention.

Among the objects of the invention are the following:

(a) To provide a bulk alloy, capable of being formed into particles by machining or spinning processes, having the compositions I, Al, Cr, II, or I, Al, Cr, III; wherein I may be Co, Fe, or Ni, or both Co and Ni; and II may be Y Sc, or Rare Earths, and III may be Si, Hf, Zr, Cb, or Ta; and wherein the composition by weight percent is:

| Element | Broad Range | Preferred Range |
| --- | --- | --- |
| I | remainder to 100% | remainder to 100% |
| Al | about 5–20 | about 8–12 |
| Cr | about 10–27 | about 15–17 when I=Ni or Co |
|  |  | about 15–23 when I=Fe |
| II | about .01–0.5 | about .01–.25 when I=Ni or Co |
| III | about 0.5–2.0 when I=Co or Ni | about 0.7–1.0 when I=Co or Ni |
|  | about 0.1–1.0 when I=Fe | about 0.4–0.6 when I=Fe; |

(b) To provide a porous material comprising intermeshed fine metal fibers and/or powders of the alloy of (a);

(c) To provide a new and improved seal consisting of the compacted and sintered porous materials of (b);

(d) To provide a seal as in (c) wherein the Al content of the fibers and/or powders is at least sufficient to form a protective coating of $Al_2O_3$ at least one half micron thick on the fiber of powder particle and still have at least a 4% Al content in the substrate;

(e) To provide a metal compact as in (d) wherein the fibers have a diameter of from about 4 to about 150 microns and preferably from about 4 to about 25 microns, and most preferably from about 8 to about 12 microns, and the powder particles have a diameter of from about 4 to about 100 microns, preferably from about 8 to 40 microns and most preferably from about 8 to about 25 microns;

(f) To provide a metal compact as in (e) wherein the aspect ratio of the fibers is from about 10 to about 4200, preferably about 10 to about 100 and most preferably around 50, and the aspect ratio of the powder is about 1 to 8;

(g) To provide a metal compact as in (f) wherein the Al content of the fiber is at least equal to that given in the equation %Al = [(0.474/D) + 0.04] 100, wherein D is the diameter of the fiber in microns;

(h) To provide a metal compact as in (f) wherein the Al content of the powder particle is at least equal to that given in the equation %Al = [(0.710/D) + 0.04] 100, wherein D is the diameter of the particle in microns;

(i) To provide a metal compact seal as in (g) and (h) wherein the compacted and sintered fibers and/or powder particles are coated with a protective coating of $Al_2O_3$ at least 0.5 microns in thickness;

(j) To provide a metal particle compact wherein at least some of the particles have different alloy compositions, falling within the broad definition given in (a); and, (k) To provide metal particle compacts comprising NiCrAlY and NiCrAlSi alloys falling within the range set forth in (a).

The above and further objects and features of the invention will become apparent from the following detailed description and accompanying drawings.

DESCRIPTION OF PREFERRED EMBODIMENTS

Referring to FIG. 1, reference numeral 1 represents the outer casing structure of a turboengine which has structurally mounted thereon stationary turbine vanes 2, only one of which is shown. Rotating blades 3 and 4 are secured to the rotor wheel (not shown) of the engine. Mounted between the blades 3 and 4 and fastened thereto is a sealing means 5, having an inner portion 6 and an outer portion 7. Abradable seals 8 and 9 are mounted on casing 1 adjacent to tips 10 and 11 of blades 3 and 4 and comprise the outer seal. Outer portion 7 of element 5 has projecting rings 12 integrally secured thereon. Thin, circular knife edges 13 are fastened, in turn, on rings 12.

A seal land ring 14 is secured to the inner portion of vanes 2. Abradable seals 15 are mounted on the inner face of land 14 and comprise the inner seal. As an engine is brought to operating temperature and speed, knife edges 13 expand radially greater than the inner seal surfaces 15a to permit the knife edges 13 to rub into the seals 15, and thus provide efficient rotary sealing action.

The abradable sealing material, described hereinafter in greater detail, consists of a compact of metal fibers, metal powders, or both, of an alloy of the composition I, Cr, Al, II, or I, Cr, Al, III, wherein I is Fe, Ni, Co, or both Ni and Co, II is Y, Si, Sc or Rare Earths, and III is Y, Si, Hf, Zr, Cb, or Ta. In use under high temperature oxidizing conditions, the compact comprising intermeshed, compacted and sintered fibers and/or powders becomes coated with a protective layer of $Al_2O_3$, which serves to reduce or prevent in large measure further oxidation.

The compact does not contain any loose particles, and the terms "fibers" and "powder" when used in connection with the mat or compact structure are to be understood as referring to the sintered and joined together fiber strands and powder particles as they exist in the structure.

Tips 10 and 11, and knife edges 13 rub against the abradable material comprising seals 8, 9, and 15, during rotation of rotor blades 3 and 4. Any projecting portions in the seal are rubbed away thereby establishing a minimum working clearance and a tight gas seal.

Figure 2:
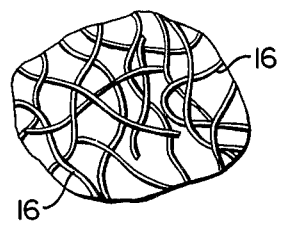
FIG. 2 is a greatly enlarged cross-sectional view of the metal fiber abradable seal embodiment of the invention.
Figure 3:
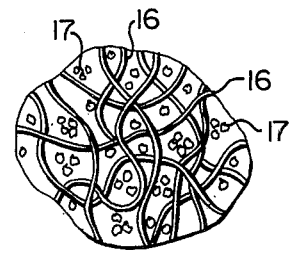
FIG. 3 is similar to FIG. 2 except that the seal consists of fibers and powder.
Figure 4:
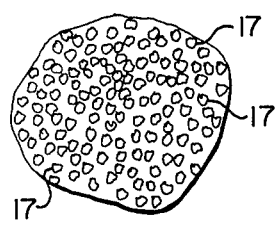
FIG. 4 is similar to FIG. 2 but shows a metal powder seal.

FIG. 2 shows the modification having an interlaced structure of metallic fibers. The abradable seal in this modification consists of interlaced and randomly oriented fibers 16. In another embodiment of the invention, as shown in FIG. 3, some of the voids between fibers are filled with a metal powder 17 of the same or similar alloy composition falling within the generic formula, and the compact as a whole is sintered together so that the metallic fibers and the powder and bonded (fiber to fiber, powder particle to powder particle, and fiber to powder particle) to form a friable structure having the requisite physical strength to serve as a seal. In a further modification, shown in FIG. 5, the compact is made entirely of metal powder.

Some methods for making small diameter metal fibers usable in this invention are disclosed in U.S. Pat. Nos. 3,394,213; 3,505,039; 3,504,516; 3,277,564; 3,379,000; and 3,698,863, which are owned by assignee hereof. Methods for making metal fiber compacts or mats of the type described herein are shown in U.S. Pat. Nos. 3,127,668; 3,505,038; and 3,469,297, the latter two being owned by the assignee hereof. Processes for making metal powders and metal powder compacts are well known to the art. See, for example, "Powder Metallurgy", Editor John Wulff, 1942, published by the American Society for Metals; "Powder Metallurgy, Practice and Application", by Sands and Shakespeare, 1966, George Newnes Ltd., publisher, London; and U.S. Pat. Nos. 3,268,997; and 3,350,178.

ALLOY COMPOSITION

It has been discovered that alloys having the composition set forth below can be formed in bulk shapes and are machineable and otherwise susceptible to metal working operations to form the metal particles which comprise the abradable seals of this invention. Said alloys impart the requisite properties to the metal particles and compacts made therefrom and have the following compositions in weight percent:

TABLE I[1]

| Alloy | Ni[2] | Fe | Al | Cr | Y[3] | Si[4] |
|---|---|---|---|---|---|---|
| A. NiCrAlY | | | | | | |
| Broad Range (or CoCrAlY) | Bal. | — | 5–20 | 10–27 | .01–.5 | |
| Preferred Range | Bal. | — | 8.0–12 | 15–17 | .01–.25 | |
| B. NiCrAlSi | | | | | | |
| Broad Range (or CoCrAlSi) | Bal. | — | 5–20 | 10–27 | — | .5–2.0 |
| Preferred Range | Bal. | — | 8.0–12 | 15–17 | — | .7–1.0 |
| C. FeCrAlY | | | | | | |
| Broad Range | — | Bal. | 5–20 | 10–27 | .01–.5 | |
| Preferred Range | — | Bal. | 8.0–12 | 15–23 | .01–.1 | |
| D. FeCrAlSi | | | | | | |
| Broad Range | — | Bal. | 5–20 | 10–27 | — | .1–1.0 |
| Preferred Range | — | Bal. | 8.0–12 | 15–23 | — | .4–.6 |

[1]Elements given in weight percent.
[2]Nickel may be substituted wholly or in part with Cobalt.
[3]Yttrium may be substituted with Scandium or the rare earth elements.
[4]Silicon may be substituted with other known oxide stabilizers (Hf, Zr, Cb, Ta).

Alloys NiCrAlY and NiCrAlSi are preferred because of their lower melting points. Without being bound by any theory, it appears that the superior abrading properties result from the fact that the melting point of the seal alloy is lower than the conventional metals employed for the rotor blade tips and knife edges that are rubbed against the abradable seal material. Sufficient Al must be present in the alloy to provide a coating of $Al_2O_3$ resulting from oxidation of the metal particle (fiber or powder) of at least 0.5 micron in thickness. Additionally, the substrate must retain an Al content of at least 4% in order to provide additional Al for "healing" any fractures in the $Al_2O_3$ scales or coating and for the replacement of any spalled $Al_2O_3$.

While usually a single alloy will be used in making the fibers and powders, in order to meet specific requirements, mixtures of fibers and/or powders of different elemental or weight percent compositions falling within the generic alloy class and weight percent range may be employed in the compact. Where two or more alloys containing different elements are employed, under the high temperature conditions of use diffusion of elements can take place between particles of differing composition which are in contact. As a result, highly complex alloy mixtures may be formed.

That the metal fibers employed in compacts of this invention could be made from the alloy compositions described herein, having Al compositions above 5%, is quite surprising since the generally held opinion was that such alloys would be too brittle for the machining and other mechanical operations required to make the fibers.

It can be demonstrated mathematically that the relationship between the Al content of the alloy (given as the fraction of Al in metal) and the diameter in microns (D) of a fiber having a circular cross-section required to yield a 0.5 micron coating of $Al_2O_3$ while retaining a 4% Al content in the core is:

percent Al in metal fiber = $[(0.474/D) + 0.04]\, 100$.

While this gives the relationship between the minimum thickness of $Al_2O_3$ which is useful and the Al alloy content, it is to be understood that greater thicknesses are included within the scope of the invention, subject to the limitation that the substrate must contain at least 4% Al. Although this formula is based on fibers having a circular cross-section, it gives the minimum Al content required in the alloy for the diameter of any shape fiber.

The analogous relationship for the coating on a spherical metal powder particle is:

percent Al in metal spheres = $[(0.710/D) + 0.04]\, 100$.

Figure 5:
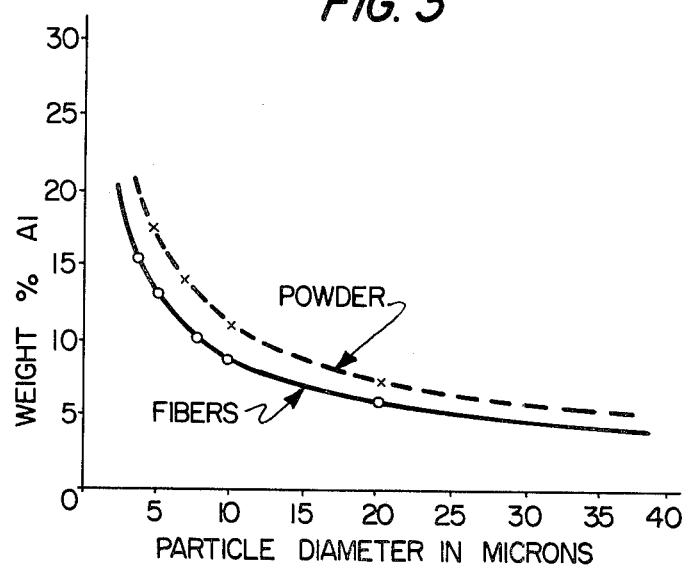
FIG. 5 is a graph showing the relationship between the fiber diameter and the weight percent aluminum in the alloy necessary to provide a 0.5 micron $Al_2O_3$ coating on the fiber while retaining at least 4% Al in the fiber case.

These relationships are shown graphically in FIG. 5, wherein it can be seen that the following relationships, for example, apply.

| Diameter in Microns | Min. % Al Required for Fibers | Min. % Al Required for Spheres |
|---|---|---|
| 5 | 13.5 | 18.2 |
| 8 | 9.9 | 12.9 |
| 10 | 8.7 | 11.1 |
| 20 | 6.4 | 7.6 |

While this figure gives the relationship for the minimum aluminum content required to provide a minimum thickness of 0.5 micron of $Al_2O_3$ while maintaining at least 4% aluminum in the substrate for oxide healing, it is to be understood that thinner coatings will be developed during the early oxidation life and that greater thicknesses are included within the scope of the invention subject to the limitation that the substrate alloy must retain at least 4% aluminum after oxidation.

PREPARATION OF COMPACT

Compacts formed solely from metal fibers may be made by a number of different processes. For example a thin web of metal fibers may be formed by an air layering process as taught in U.S. Pat. No. 3,505,038, or by the water slurry process shown in U.S. Pat. No. 3,127,668. In order to increase the green strength of the mat, cellulosic fibers, such as cotton linters, cellulose esters and ethers, rayon, etc., may be added to the mass of the fibers being layered to form the raw mat.

The web of fibers so prepared is then compressed and sintered to form the compact. Its density may be varied by varying the amount of compression applied to the web and/or by adding destructable material to the raw fiber mat which is destroyed during the sintering step. As is well known to the art, particles of wood, plastic, or volatile compounds may be employed for this purpose.

Compacts of both metal fibers and powders can be made by first forming a web from metal fibers by any of the methods known to the art, then sifting the metal powder into the open spaces of the web, and finally compacting and sintering the mass of fibers and powders to bond the mass. In another modification, the fibers and powder can be mixed together in desired proportions, formed into a web by the methods of the prior art and then compacting and sintering. The powder content of the compact may vary from 10–50% and more preferably from 30–50%. The addition of powder to the raw mat reduces the porosity, and thus permits a desired density to be reached with less compaction. In sintering the metal fiber-powder web, not only are points of fiber interaction bonded together, but the metal powder particles become bonded to the fibers and to each other.

Metal powder compacts may be prepared as shown generally in U.S. Pat. Nos. 3,268,997 and 3,350,178. Briefly, this involves mixing the powder with a liquid binder or cellulosic material for green strength, adding volatile materials to make the compact porous, compressing the mixture and sintering.

GEOMETRY OF PARTICLES

It has been further discovered that the quality of results achieved in the rubbing step depends on the aspect ratio (ratio of length to diameter) of the particles making up the seal. The broad range of aspect ratios of the metal fibers is from about 10 to about 4200 and more preferably 10 to 100, with the optimum value being about 50. In the case of the metal powders, the optimum aspect ratio is 1, but may be as high as 7 or 8.

The fibers may range in diameter from about 4 microns to about 150 microns, preferably about 5 to about 25 microns, with about 8 to about 12 microns being most preferred. In mixed fiber compacts, it has been found preferable to have the fiber sizes widely separated, such as for example, a mixture comprising fibers ranging in size of about 100 to 150 microns mixed with fibers of about 8 to 12 microns. The metal powder may range in individual particle diameter from about 4 to about 100 microns, preferably about 5 to about 75 microns, and most preferably about 5 to about 25 microns. The term "diameter" as employed in the specification and claims is intended to include not only the diameters of cylindrical fibers and spherical particles of powder, but also, in the case of non-cylindrical fibers and non-spherical powders, an equivalent theoretical diameter. In this case of a cylinder, the ratio of volume (V) to surface area (A) is D/4, where D is the diameter, and the cases of a sphere is D/6. The theoretical diameter of a fiber is determined by measuring its geometrical configuration, determining its surface area and volume, and substituting in the equation V/A − D/4. Similarly, in the case of a powder particle, the ratio of the volume of area is multiplied by 6 to give the theoretical diameter.

While the formulae for the minimum $Al_2O_3$ coating, previously set forth, are based on particles having circular cross-sections, they give the minimum Al content for any shape particles having the same theoretical diameters as the circular cross-section particles.

DENSITY OF COMPACT

The density of the compact is an important property which has a considerable effect on the utility of the seal. For purposes of this specification, "density" is defined as the weight of a unit volume of the compact or mat divided by the weight of the same volume of a solid metal of the same material used to make the particles. Thus, a compact or mat having a 20% density has 20% of the weight of an equal volume of the solid metal. "Porosity" is 100 minus the density; a compact having a 20% density has an 80% porosity.

The density of the compact can vary from about 10 to about 50%, preferably from about 14 to about 30%. Optimum density varies with the intended use. For use in an inner air seal of a gas turbine where the abradable material is rubbed with a knife edge, as with elements 13 and 15 in FIG. 1, the compact density should preferably be within the range of 14 to 20%. However, with a rotary blade tip seal, as shown in elements 8, 9, 10, 11 in FIG. 1, the optimum density is about 21%. In general, for higher tip speeds and higher gas velocities in the turbine, higher densities are preferred for added erosion resistance.

When employing powders either in combination with fibers or alone, densities of about 14% to about 70% may be readily obtained. Densities of about 30 to about 70% may be employed when the compact consists of metal powders with a density range of 30-40% being preferred.

Methods for varying compact densities have been discussed above in connection with methods for preparing the compact.

EXAMPLE

In making the seals, the metal particles, prepared by any of the methods of the prior art, are formed into a mat of the required shape and the desired density. As set forth herein above, the compact may consist of fibers and/or metal powder. After forming, the mat is sintered to give it the desired strength, subjected to high temperature oxidation conditions to form an $Al_2O_3$ coating, and is then mounted in the turboengine where it is rubbed to the proper seal clearance. Laboratory tests have shown abradable seals of this invention to be satisfactory in resisting oxidation in air up to a temperature of 1515° F for 10,000 hours.

The following example is directed to the making of a NiCrAlY seal:

NiCrAlY fibers having a surface area equivalent to a 5-6 micron circular fiber and an average aspect ratio of about 60 was formed into a web from a fiber slurry. This fiber had the composition of 15.7% Cr, 9.5% Al, 0.21% Yttrium, balance Nickel. The apparent density of the formed web was 13.7%. It was sintered in vacuum for 6 hours at 2150° F and compacted in a rolling mill to 22% density. As a result of change in surface area of the fibers during sintering, the finished product had a surface area equivalent to an 11-13 micron circular fiber.

As a result of some volatization in sintering, the chemical composition of the finished product was 13.8-15.0% Cr, 8.7-9.4% Al, 0.18% Y, balance Ni. Strips were cut from the finished NiCrAlY fiber metal sheet, then were roll formed and brazed into a test stator ring and subjected to a temperature of about 1650° F for 500 hours thereby forming at least a 0.5 micron $Al_2O_3$ coating on the exposed surfaces of the fiber metal.

From the above description it is apparent that the present invention includes the formation of metal compacts suitable for high temperature seals from fine metal particles which are capable of forming a thin protective coating of $Al_2O_3$ over their surfaces, to the alloy composition of said particles, and to the relationship between the particle diameter and the Al content of the alloy.

What is claimed:

1. A porous metal mat or compact resistant to oxidation at high temperatures comprising:
   (a) a sintered mass of fine metal particles composed of a homogenous alloy consisting essentially of the composition I, Cr, Al and Si, wherein I is at least one member of the group consisting of Fe, Co, Ni, and mixtures of Co and Ni;
   (b) the components of the alloy having essentially the following weight percents: 10-27% Cr, not more than 20% Al, 0.1-2.0% Si, and, I=the remainder;
   (c) the exposed surface of the particles being capable of developing a protective coating of $Al_2O_3$ at least 0.5 micron in thickness over an underlying substrate of at least 4% Al content.

2. The article of claim 1 wherein the mat or compact is formed from metal particles consisting essentially of metal fibers or metal powders or both, and wherein the Al content of the alloy comprising substantially each metal fiber, is equal to at least that given in the equation:

$$\% \text{ Al} = [(0.474/D) + 0.04] 100,$$

and the Al content of the alloy comprising substantially each metal powder particle, is equal to at least that given in the equation:

$$\% \text{ Al} = [(0.710/D) + 0.04] 100,$$

D being the particle diameter in microns.

3. The article of claim 2 wherein the fiber diameter is from about 8 to about 12 microns, the metal powder diameter is from about 4 to about 100 microns, the fiber aspect ratio is from about 10 to about 4200, the metal powder aspect ratio is about 1 to 8, and the compact density is from about 14% to about 30%.

4. The article of claim 2 wherein about 10 to about 50% by weight of the particle consists of metal powder.

5. The article of claim 4 wherein from about 30 to about 50% by weight consists of metal powder having a diameter of from about 4 to about 100 microns, and the metal fibers have a diameter of from about 4 to about 150 microns, and the compact density is from about 14% to about 30%.

6. The article of claim 2 wherein the mat or compact is formed essentially of metal fibers of a diameter of from about 4 to about 150 microns, and an aspect ratio of from about 10 to about 4200, said mat or compact having a density of from about 14% to about 30%.

* * * * *